United States Patent [19]

Houle

[11] 4,406,413

[45] Sep. 27, 1983

[54] APPARATUS FOR HANDLING SLURRY AND MANURE PUMP

[75] Inventor: Michel Houle, Wickham, Canada

[73] Assignee: J. Houle & Fils Inc., Quebec, Canada

[21] Appl. No.: 168,360

[22] Filed: Jul. 15, 1980

[30] Foreign Application Priority Data

Jul. 4, 1980 [CA] Canada .................................. 355426

[51] Int. Cl.³ ............................................ B02C 23/36
[52] U.S. Cl. ............................ 241/46.04; 241/46.11; 241/101.7
[58] Field of Search ............... 366/263, 264, 265, 295, 366/137, 190, 292, 192, 193, 302, 309, 312; 241/46 B, 46.04, 46.11, 46.17, 161 B, 101.2, 101.7, 167, 166

[56] References Cited

U.S. PATENT DOCUMENTS 2,578,805  12/1951  Johnson ........................... 366/264 X
3,537,659  11/1970  Vagedes ......................... 241/101.2 X

OTHER PUBLICATIONS

Flygt; Mixing Liquid Manure the New, Profitable Way; Jun. 1980.
Public Use Showing Propeller and Shear Bar, as Shown in Attached Farwest Literature.

*Primary Examiner*—Mark Rosenbaum
*Assistant Examiner*—Timothy V. Eley
*Attorney, Agent, or Firm*—Larson & Taylor

[57] ABSTRACT

An improved apparatus for agitating and pumping slurry such as manure in a reservoir. A vertical support assembly carries at its lower end the combination of an agitating propeller and of a centrifugal pump used for circulating the slurry. A propeller assembly which has a fixed scraper blade immediately adjacent the leading edge of the propeller blades. The propeller is rotated by a drive shaft via a gear box pivotally mounted to the support assembly.

25 Claims, 7 Drawing Figures

APPARATUS FOR HANDLING SLURRY AND MANURE PUMP

This invention relates to apparatus for handling slurry such as manure in large containers such as pits, tanks and the like. It relates in particular to apparatus for agitating, mixing and pumping slurry.

BACKGROUND OF THE INVENTION

Farm animal manure is normally collected in large manure collection containers, for instance, barn collection pits, above-the-ground tanks, in-the-ground tanks and lagoon pits, where it is stored until it is time to spread same onto the fields to act as a fertilizer. It may also be necessary to transfer manure from one container to another. The spreading operation is usually performed by a motorized manure spreader which carries the manure in a tank. Thus, apparatus is required for chopping floating crusts in such containers, for mixing the solid particles with the liquid in order to obtain a suspension, and for pumping manure out of such containers into other containers or manure spreaders.

Farm animal manure consists of solid particles in a liquid, and the solid particles either settle on the bottom of the container (as in the case of pig manure) or form a crust over the liquid (as in the case of cow manure) depending on the density of the solid matter and, in some cases, both conditions obtain. Thus, the mass of manure in the container must be thoroughly mixed prior to pumping in order to maintain the solid particles in suspension, otherwise only the liquid matter will be pumped out while the solid matter accumulates in the container. Moreover, such solid matter tends to clog the pump.

Hitherto, manure handling pumps consisted of a powerful centrifugal pump disposed near the bottom of the container, the impeller turning about a vertical axis, and a conduit system coupled to the outlet of the pump for either circulating manure within the container or away therefrom into a manure spreader or a different container. The conduit system therefore has a first branch leading out of the container toward another container or toward a tank spreader, and a second branch leading to a suitable nozzle pipe for returning into the container the slurry being mixed. A gate controls the selection of conduit branch in order to either agitate the slurry or pump same out of the reservoir. Examples of such centrifugal systems of which many different designs are currently available from farm equipment manufacturers, are described in U.S. Pat. Nos. 3,905,725 dated Sept. 16, 1975 (R. L. Johnson), 3,446,151, May 27, 1969 (H. G. V. Anderson), 3,456,592, July 22, 1969 (L. L. Nelsen) and 3,966,361, June 29, 1976 (B. L. House). Such devices however provide limited efficiency when the reservoir contains a thick floating crust or heavy bottom sediments. Indeed, the mixing capabilities of centrifugal pump systems are at best limited and time consuming, and no agitation takes place during transfer of the slurry to a different container into a tank spreader. Furthermore, clogging of the pump's impeller and consequential loss of pump efficiency remains a serious shortcoming.

It is also known to provide a propeller mixer on a vertical rail mounted to the wall of a container, with means to change the level of the propeller's axis in order to agitate the slurry therein. The mounting structure can be rotated around a vertical axis in order to change the direction of the propeller's axis in a horizontal plane. One such mixer powered by an electric motor and sold under the Trade Mark FLYGT, is manufactured in Sweden by Flygt AB. However, such mixers, although relatively efficient for mixing slurry, when well maintained, are prohibitively expensive to most farms and they are not usable for transferring slurry out of the container. Moreover, in thick manure, it is very difficult to rotate the mounting structure in order to change the direction of the impeller's axis.

SUMMARY OF THE INVENTION

The object of this invention therefore, is to provide more efficient apparatus for handling slurry and manure in collection reservoirs than prior equipment.

I have found that by combining on the lower end of the same vertical support assembly a suitable centrifugal pump having its impeller axis substantially vertical, and a mixing propeller mounted to the same support assembly, with its propeller axis substantially horizontal, adjacent the inlet of the centrifugal pump, one can obtain an extremely efficient and low-cost slurry handling system which requires practically no maintenance. I have also found that the system of my invention procures the added advantage that the centrifugal pump thereof consistently operates at maximum efficiency regardless of the nature of the manure being handled and regardless of the duration of the agitation or mixing process and of the subsequent pumping operation. This surprising result appears to be attributable to the fact that agitation is maintained by the propeller throughout the mixing and pumping phases of the manure handling operation. I have devised such a system which is portable behind an ordinary farm tractor and which may be constructed in many different versions, three of which are designed for use either in in-the-ground tanks, above-the-ground tanks or lagoon pits.

The standard power take-off of a farm tractor can be used for simultaneously driving the pump and the mixing propeller via a single drive shaft leading downwardly to a double output shaft gearbox whose horizontal output shaft mounts the mixing propeller. By supporting the gearbox between two spaced apart, apertured journal plates whose common axis coincides with that of the vertical input and output shafts of the gearbox a very convenient means for pivoting the propeller axis in a horizontal plane is obtained.

Indeed, with such a gearbox mounting system, it is not necessary to take the pump out of the manure container for rotating its body around a vertical axis in order to change the direction of the recirculating jet of liquid during the crust chopping and mixing operation. A small hand operated crank suffices to turn the submerged gearbox about its vertical axis and the pump and impeller mounted thereto, even under thick and solid crust conditions.

A fixed scraper adjacent the flat leading edge of the propeller blades assures constant propeller efficiency by cutting fibers, strings and the like which otherwise would soon wind around the propeller and form crusts onto the propeller blades and eventually form a large mass of solid matter. This scraper is in the form of a single or multi-blade cutter of limited size preferably secured to the housing of the gearbox and so disposed that its sharp edges cooperate with the leading edge of the propeller blade to act as scissors for cutting strings, fibers and the like. I have found that this combination of a fixed cutting scraper and of a mixing propeller can find application in devices other than centrifugal pumps such as, for example, slurry mixing propellers. I also provide grooves on the scraping surface of the scraper blade in order to define additional cutting edges.

The accompanying drawings illustrate preferred embodiments of the invention.

DESCRIPTION OF THE PREFERRED EMBODIMENTS

Figure 1:
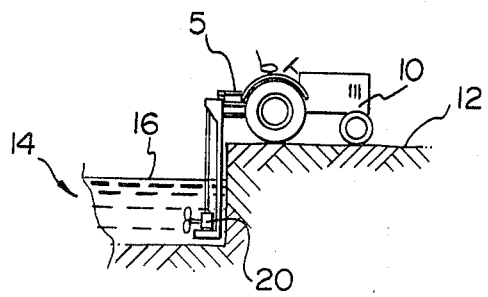
FIG. 1 is a side elevational view of a manure pump assembly mounted to a farm tractor, with the pump submerged into an in-the-ground tank.
Figure 2:
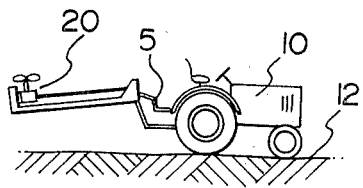
FIG. 2 is a side elevational view of the pump assembly shown in FIG. 1 but in the elevated position behind a farm tractor.

With reference to the drawings, pump assemblies according to this invention may be advantageously by mounted to the standard hitch 5 of a conventional farm tractor 10 by means of different support structures depending upon the type of manure storage equipment in use. In FIG. 1, the surface of the ground is indicated at line 12 and an in-the-ground tank 14 containing manure up to level line 16 is partially illustrated. The manure pump assembly 20 is suitably mounted to the standard hitch 5 of farm tractor 10 for pivotal motion about a horizontal axis (not shown) so that before and after the mixing and pumping operation, the pump assembly 20 may extend essentially outwardly rearwardly as shown in FIG. 2.

Figure 3:
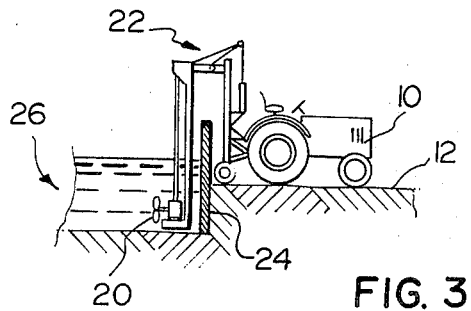
FIG. 3 is a side elevational view of a manure pump assembly of the type adapted for use in on-the-ground tanks, also mounted to a farm tractor.

A first alternative support structure in accordance with this invention, is shown in FIG. 3. It consists of an inverted U-shaped arrangement 22 designed to extend over wall 24 of an on-the-ground tank 26.

Figure 4:
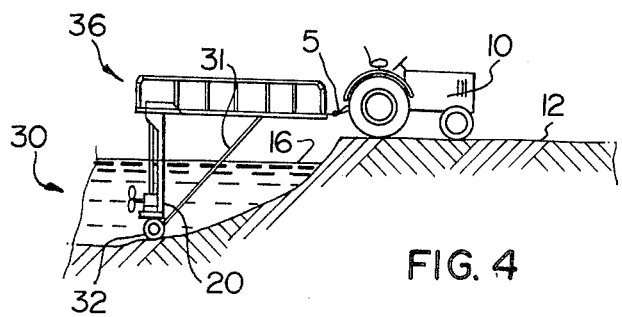
FIG. 4 is a similar view but of a third support assembly design, for use in a lagoon pit, mounted to a tractor.

FIG. 4 shows a third support structure design. This embodiment is adapted for use with lagoon pits such as shown at 30. Wheels 32 allow the right angled support structure 36 to roll along the sloping bottom of the lagoon pit 30 when inserting or withdrawing the pump assembly 20. A catwalk and side railing structure 38 enables the operator to reach the head of the pump assembly where the controls are located. Brace 31 strengthens the angled support structure 36.

Figure 6:
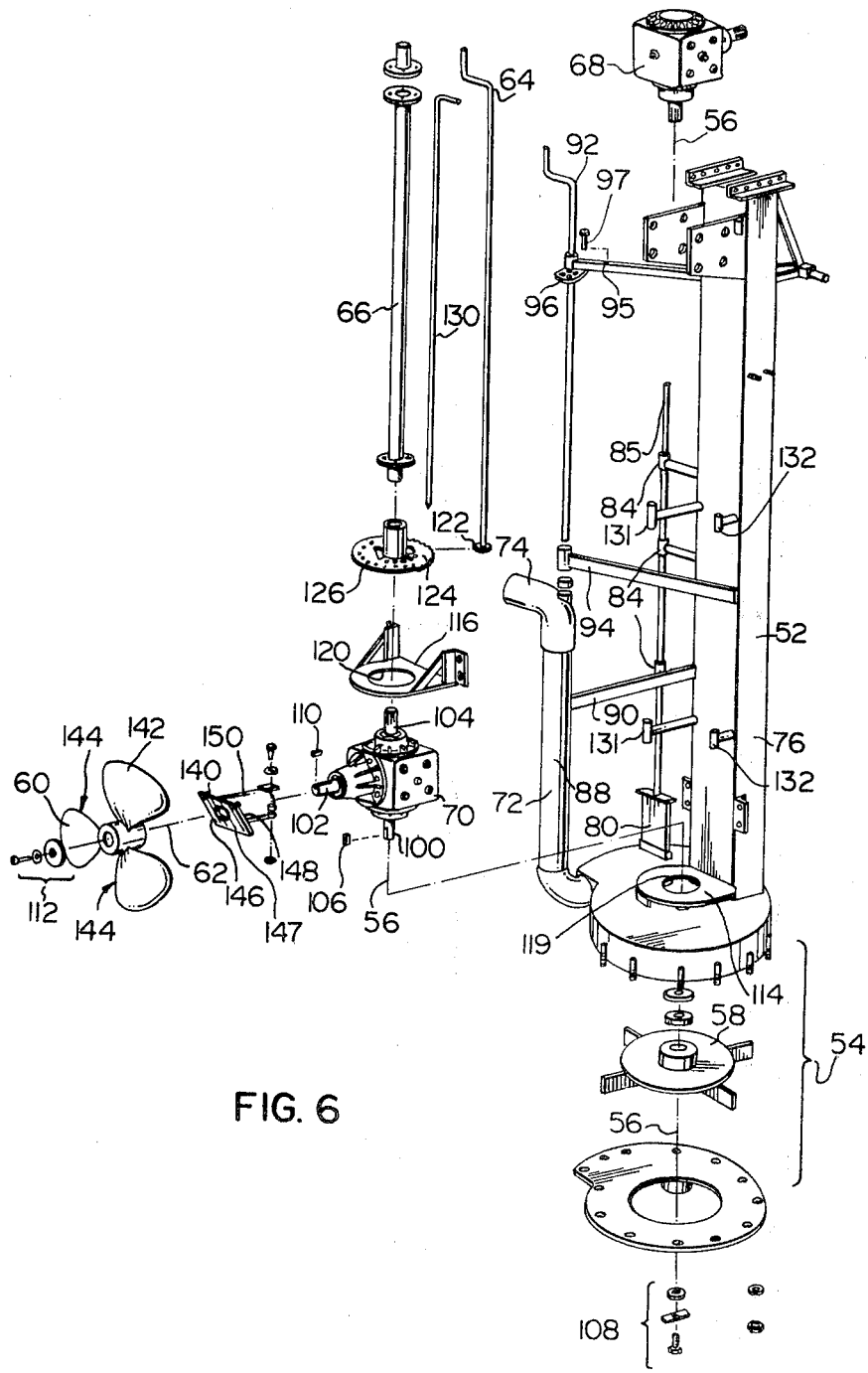
FIG. 6 is an exploded view of the assembly shown in FIG. 5.

In all three support structures thus far described, the pump assembly 20 is essentially the same. Such assembly is shown in greater detail in FIGS. 5 and 6.

The pump assembly 20 comprises a support assembly 52 which extends vertically when operating. It carries, at its lower end, a suitable centrifigual pump 54 whose impeller axis 56 is vertical. The impeller is visible at 58 in FIG. 6.

The pump assembly 20 also comprises, as a main component, a mixing propeller 60. The axis of rotation of mixing propeller 60 is horizontal as shown at reference numeral 62.

As will be described hereinafter the mixing propeller 60 is also pivotable around vertical axis 56 within limits and a control device 64 is provided in order to set the angular position of the mixing propeller's axis 60 relative to support assembly 52. A drive shaft 66, driven into rotation by the farm tractor's power take off (not shown) via 90° gearbox 68, rotates the impeller 58 of centrifugal pumps 54 and mixing propeller 60 via a double output gearbox 70.

Figures 5, 7:
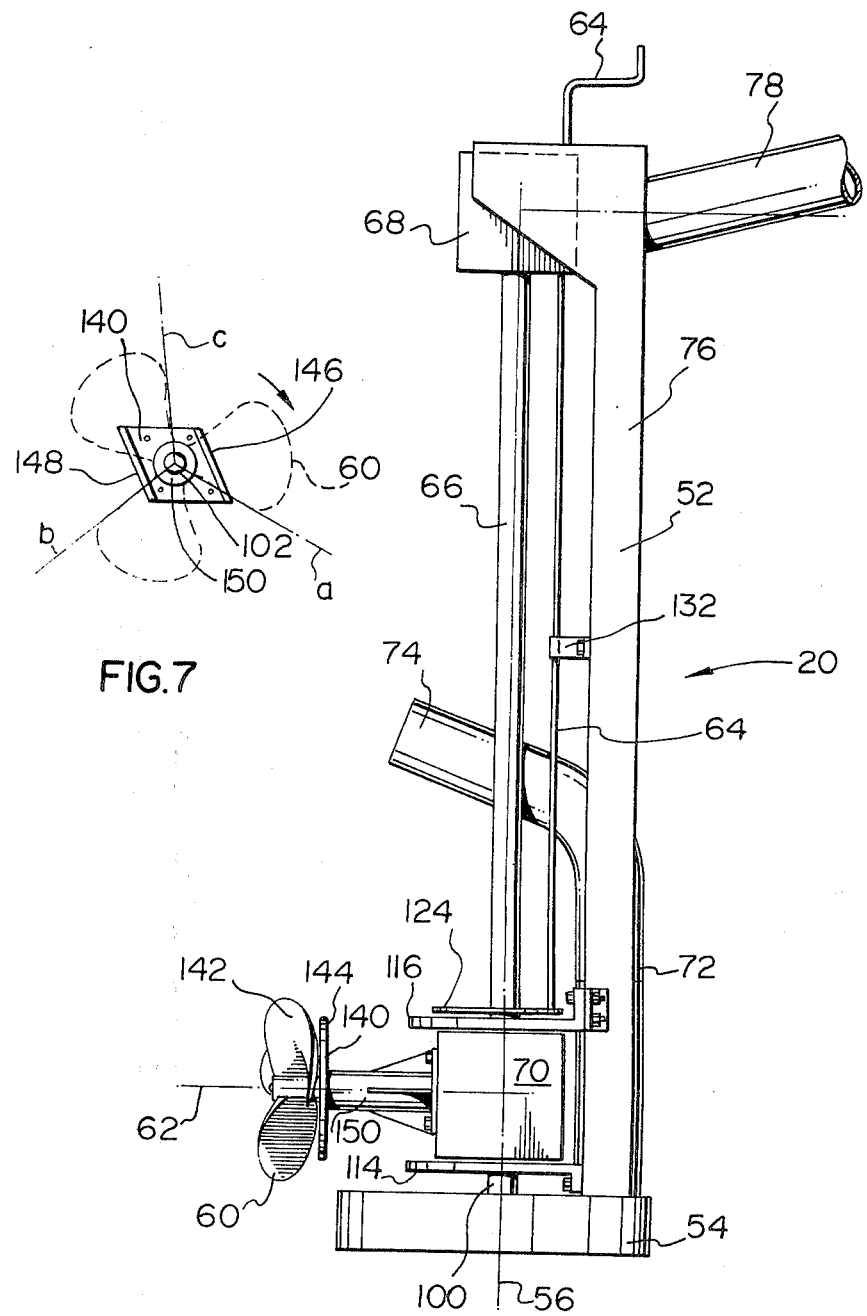
FIG. 5 is a side elevational view of a manure pump assembly in accordance with this invention, but without any accessories for connection to a farm tractor.
FIG. 7 is a rear elevational view of the scraper blade with a propeller in dotted line.

The centrifugal pump 54 has a first branch circuit 72 leading from the output of centrifugal pump 54 to a suitable nozzle 74. This first slurry conduit is used for recirculating manure within the container or pit during the mixing operation which normally preceeds pumping. The length of pipe 72 may vary according to the requirements of different applications. For example, in cow manure open tanks or pits, tube 72 may be much longer than is shown in FIG. 5 thereby to provide a jet of manure at nozzle 74 over the floating crust of manure. A second branch circuit 76 is provided for pumping manure out of the container. It comprises a conduit 76 defined by support assembly 52 and leading from the output of centrifugal pump 54 to discharge tube 78 (see FIG. 5). A gate 80 may be lowered in order to block first branch circuit 72 as is well known in the art; and a second gate, not shown, closes the second branch circuit 76 at any suitable region thereof, normally close to discharge tube 78. Lugs 84 guide rod 85 to which gate 80 is connected. Rod 85 is used to raise and lower gate 80. The upper end of rod 85 may also support the second gate so that when rod 85 closes one gate it opens the other gate and vice versa. However, in accordance with this invention, it may be desirable to disconnect the two gates so as to close both gates simultaneously. This condition has been found desirable when mixing propeller 60 performs the function of mixing heavy sediments and the liquid in the container and when it is desirable to shut-off centrifugal pump 54 to save energy. For this purpose it becomes necessary to select a centrifugal pump design which can turn freely with its output blocked by the gates.

Nozzle 74 should be pivotable in order to change the direction of the manure discharge flow, and in accordance with well known techniques, the upright pipe 88 is secured to the support assembly 52 by a suitable brace 90 while the nozzle 74 is pivotable with respect thereto. A manual control, in the form of a hand crank 92 supported to the support assembly 52 by braces 94 and 95, and an apertured sector 96 with a drop pin 97 constitute a suitable nozzle positioning means.

In accordance with this invention, the pivotal motion of the mixing propeller 60 is advantageously obtained by using a gearbox 70 which has two 90° output shafts 100 and 102 and one input shaft 104 coaxial to output shaft 100. The impeller 58 of centrifugal pump 54 is keyed to output shaft 100 by key 106 and held in place by a suitable arrangement 108 of a washer, a lock and a bolt. Likewise, mixing propeller 60 is keyed to output shaft 102 by key 110 and held in place by washers and bolt 112. Two spaced apart journal plates 114 and 116 secured to support assembly 52 and provided with coaxial apertures 119 and 120 retain gearbox 70 which remains free to pivot relative to support assembly 52 within limits. The angular position of gearbox 70 and of the mixing propeller 60 thereon is determined by hand crank and rod 64 whose pinion 122 meshes with toothed ring 124 connected ridigly to gearbox 70. The angular extent of the toothed region of ring 124 determines the limits within which mixing propeller 60 may be pivoted around vertical axis 56. A series of apertures 126 through toothed ring 124 define an arc of a circle coaxial with ring 124 and enable locking of gearbox 70 in any desired position by means of rod 130 guided by lugs 131. Lugs 132 guide rod 64 in a similar fashion.

When it is desired to change the orientation of the jet produced by the mixing propeller 60 it is not necessary to take the pump assembly out of the manure container, which would be a time consuming manoeuvre. It is sufficient to withdraw rod 130 from engagement with toothed ring 124 and rotate hand crank 64 whose pinion 122 turns toothed wheel 124, gearbox 70 and mixing propeller 60 around axis 56. Release of rod 130 will allow its nose portion to engage the registering one of apertures 126 and lock the assembly in the corresponding position. This is easily accomplished during a short interruption of the mixing and/or pumping processes, on account of the fact that the pivoting axis of mixing propeller 60 coincides with the axis of rotation of the centrifugal pump which is that of gearbox 70.

In accordance with this invention I also provide a scraper blade 140 immediately adjacent the leading edges 144 of the blades 142 of mixing propeller 60 whose pitch and sense of rotation produce an outwardly directly jet of matter generally toward the center of the manure container. These leading edges 144 are contained in a common plane which is perpendicular to axis 62, and they cooperate with cutting edges 146, 148 of scraper blade 140 to define scissor like-cutting formations which are essentially V-shaped. Although two cutting edges 146 and 148 are shown, a single cutting edge should suffice in most applications. FIG. 7 shows the relationship of the leading edges at lines a, b and c of mixing propeller 60 (shown in dotted line) with cutting edges 146 and 148 of scraper blade 140. As illustrated, line b and cutting edge 148 define a first V-shaped scissor-like formation, line c is completely beyond cutting edge 148, and line a defines, with the outer half of cutting edge 146 an other, less obtuse V-shaped scissor-like formation. These formations cut fibers, strings and the like which otherwise wind around-the-propeller hub and its shaft and eventually form an enlarging mass of fibrous matter. The accumulation of matter onto mixing propeller 60 causes imbalance thereof, reduces its efficiency and increases the load onto the source of driving power.

In order to keep flow restriction to a bare minimum around mixing propeller 60, scraper blade 140 is relatively small and it is secured to the sleeve 150 of mixing propeller 60. This sleeve 150 is bolted to gearbox 70, and it receives shaft 102 thereof. Preferably, scraper blade 140 is diamond-shaped and its longest dimension is less than the diameter of mixing propeller 60. In a particular embodiment, using a mixing propeller of 24 inches in diameter, the longest diagonal of scraper blade 140 was 16 inches, and this arrangement produced good results. Moreover, the area of scrapes blade 140 is considerably less than the projection area of mixing propeller 60.

Additional cutting edges can be obtained by cutting sharp U-shaped grooves along the face of scraper blade 140 which contacts mixing propeller 60. These grooves may run parallel to cutting edges 146, 148 and are shown at 147 in FIG. 6.

The leading edges of mixing propeller 60 should be sharpened in order to enhance the cutting action.

I claim:

1. Apparatus for handling slurry comprising in combination a support assembly having a lower end adapted to extend into a body of slurry, a suitable centrifugal pump of conventional design secured to the lower end of said support assembly and having an impeller rotatable around an impeller axis, a mixing propeller mounted at the lower end of said support assembly in the vicinity of the pump, the axis of rotation of said mixing propeller extending generally horizontally, said mixing propeller being controllable pivotably in a generally horizontal plane around a generally vertical axis, said apparatus also comprising driving means for rotating said impeller and said propeller at sufficiently high speeds for mixing and pumping said slurry and mixing control means for changing the orientation of said axis of rotation of said mixing propeller in said horizontal plane, the mixing propeller constructed to direct the slurry away from the inlet of the pump, and the mixing propeller being positioned, relative to the pump, to draw in slurry from the vicinity of the pump inlet, and then direct the slurry away from the pump.

2. An apparatus according to claim 1, including a recirculating branch conduit leading from the outlet of the pump and positioned to recirculate the pump output into the body of the slurry being treated by the apparatus.

3. An apparatus according to claim 2, including means for reorienting said recirculating branch conduit about a vertical axis to change the direction in which the recirculated pump output is thrown out.

4. An apparatus according to claim 3, including a further branch conduit for directing the pump output away from the body of slurry being treated, and gate means for connecting the pump outlet to either the recirculating branch conduit or the further branch conduit.

5. An apparatus according to claim 1, said mixing control means comprising means for pivoting the propeller about an axis which is coincident with the pump axis.

6. An apparatus according to claim 5, wherein said driving means for driving said impeller and said mixing propeller comprises a gearbox having a casing, an input shaft, a first output shaft extending opposite said input shaft, and a second output shaft which constitutes said mixing propeller shaft and which extends at 90 degrees relative to said first output shaft, said driving means also comprising a main drive shaft coupled to said input shaft, said first output shaft being connected to said impeller for driving same into rotation about said impeller axis, said support assembly having journal means mounting said casing of said gearbox to said support assembly, said journal means allowing pivoting of said casing of said gearbox around said pivot axis.

7. An apparatus according to claim 6, wherein said journal means comprises two spaced apart journal plates pivotably receiving therebetween said casing of said gearbox, said mixing control means comprising a toothed ring fixed relative to said gearbox and adjacent thereto, a pinion in meshing engagement with said toothed ring and a crank having an extended rod carrying said pinion.

8. An apparatus according to claim 6, wherein said mixing propeller comprises a plurality of propeller blades, each one of said propeller blades having a leading edge, said leading edges of said propeller blades lying in a common plane which is perpendicular to said axis of rotation of said mixing propeller, said apparatus also comprising a scraper blade mounted fixedly relative to said casing of said gearbox, adjacent and parallel to said common plane.

9. An apparatus according to claim 8, wherein said casing of said gearbox comprises a sleeve through which said mixing propeller shaft extends, said scraper blade being secured to said sleeve.

10. An apparatus according to claim 1, wherein the mixing propeller comprises a plurality of propeller blades, each one of which blades has a leading edge, all said leading edges lying in a common plane which is perpendicular to said axis of rotation of the propeller, said mixing propeller having a housing portion which pivots therewith about said generally vertical axis, the blades of the propeller being rotational relative to the said housing portion, and including a scraper blade fixedly mounted on the housing portion and comprising a scraping blade positioned adjacent and parallel to said common plane so as to cooperate with said propeller leading edges to cut fibers and the like which enter said common plane between a propeller leading edge and a scraper blade.

11. An apparatus according to claim 10, said propeller being pivotable about an axis coincident with the pump axis, and said housing portion including a gearbox which is pivotable about said generally vertical axis, the drive means for both the propeller and the pump impeller passing through the gearbox, a propeller shaft extending from the gearbox to the propeller, a sleeve fixed to the gearbox and extending outwardly therefrom surrounding the propeller shaft, and said scraper blade being fixedly mounted on said sleeve.

12. An apparatus according to claim 11, said scraper blade being an apertured, diamond-shaped blade bolted to the free end of said sleeve, having two non-radial parallel cutting edges which extend at an angle with respect to said leading edges when intersected thereby so as to define therewith scissorlike cutting formations.

13. An apparatus according to claim 12, wherein each leading edge of said mixing propeller and both cutting edges of said scraper blade are sharpened.

14. An apparatus according to claim 13, wherein the said scraper blade is considerably less in area than the said mixing propeller, and wherein the length of said scraper blade is less than the diameter of said mixing propeller.

15. An apparatus according to claim 14, wherein a scraping face of said scraper blade comprises at least one groove defining additional cutting edges.

16. Apparatus for handling farm manure contained within a large container having a central region and a bottom surface, comprising a support assembly having a lower end adapted to extend into said container near said bottom surface, a suitable centrifugal pump mounted to the lower end of said support assembly and having an impeller, the axis of which extends essentially vertically when said support assembly is in an operating position in said container, a first branch circuit leading from the manure output of said centrifugal pump to nozzle means adapted for recirculating said manure within said container, a second branch circuit leading from said manure output of said centrifugal pump to a discharge conduit means adapted to pump manure out of said container into another receptable, gate means for selecting said branch circuits, a mixing propeller mounted to said lower end of said support assembly essentially near said centrifugal pump, the axis of rotation of said mixing propeller extending essentially horizontally when said support assembly is in an operating position in said container, a mixing propeller shaft supporting said mixing propeller, said mixing propeller shaft being pivotable within limits around a pivot axis which is parallel to the axis of the pump's impeller and the pitch of said propeller being such as to expel said manure forwardly outwardly from said support assembly toward said central region of said container when said mixing propeller is positioned about midway between said limits, said apparatus also comprising suitable driving means for driving said impeller and said mixing propeller into rotation at suitable speeds, the mixing propeller constructed to direct the slurry away from the input of the pump, and the mixing propeller being positioned, relative to the pump, to draw in slurry from the vicinity of the pump inlet, and then direct the slurry away from the pump.

17. Apparatus as defined in claim 16 wherein said pivot axis of said mixing propeller coincides with said impeller axis, said apparatus also comprising mixing control means for controllably changing the direction of the propeller's axis.

18. Apparatus as defined in claim 17 wherein said driving means for driving said impeller and said mixing propeller comprises a gearbox having a casing, an input shaft, a first output shaft extending opposite said input shaft, and a second output shaft which constitutes said mixing propeller shaft and which extends at 90 degrees relative to said first output shaft, said driving means also comprising a main drive shaft coupled to said input shaft, said first output shaft being connected to said impeller for driving same into rotation about said impeller axis, said support assembly having journal means mounting said casing of said gearbox to said support assembly, said journal means allowing pivoting of said casing of said gearbox around said pivot axis.

19. Apparatus as defined in claim 18 wherein said journal means comprises two spaced apart journal plates pivotably receiving therebetween said casing of said gearbox, said mixing control means comprising a toothed ring fixed relative to said gearbox and adjacent thereto, a pinion in meshing engagement with said toothed ring and a crank having an extended rod carrying said pinion.

20. Apparatus as defined in claim 19 wherein said toothed ring comprises a series of apertures describing an arc of a circle coaxial to said toothed ring, said apparatus also having a retractable rod guided for vertical movement relative to said support assembly, said retractable rod having a lower end engageable with any one of said apertures on said ring thereby to lock the said gearbox in position about said pivot axis.

21. Apparatus as defined in claim 18 wherein said mixing propeller comprises a plurality of propeller blades, each one of said propeller blades having a leading edge, said leading edges of said propeller blades lying in a common plane which is perpendicular to said axis of rotation of said mixing propeller, said apparatus also comprising a scraper blade mounted fixedly relative to said casing of said gearbox, adjacent and parallel to said common plane.

22. Apparatus as defined in claim 21 wherein said casing of said gearbox comprises a sleeve through which said mixing propeller shaft extends, said scraper blade being secured to said sleeve.

23. Apparatus as defined in claim 21 wherein said scraper blade is a diamon-shaped apertured plate presenting at least one sharp non-radial edge which cooperates with the leading edges of said propeller blades to form scissor-like cutting formation.

24. Apparatus as defined in claim 23 wherein the length of said scraper blade is less than the diameter of said mixing propeller, and wherein grooves are provided on a scraping face of said scraper blade in oder to provide additional cutting edges.

25. Apparatus as defined in claim 16 wherein said gate means comprises a manure flow blocking gate located adjacent said manure output of said centrifugal pump whereby to prevent pumping while said mixing propeller is operative to mix heavy sediments in the bottom of said container.

* * * * *